(12) United States Patent
Sowul et al.

(10) Patent No.: US 8,292,012 B2
(45) Date of Patent: Oct. 23, 2012

(54) APPARATUS AND METHOD FOR A QUICK START ENGINE AND HYBRID SYSTEM

(75) Inventors: Henryk Sowul, Oxford, MI (US); Victor M. Roses, Ann Arbor, MI (US); Randy Lewis Melanson, Waynesville, OH (US)

(73) Assignee: GM Global Technology Operations LLC, Detroit, MI (US)

( * ) Notice: Subject to any disclaimer, the term of this patent is extended or adjusted under 35 U.S.C. 154(b) by 878 days.

(21) Appl. No.: 12/262,319

(22) Filed: Oct. 31, 2008

(65) Prior Publication Data
US 2009/0321157 A1    Dec. 31, 2009

Related U.S. Application Data

(60) Provisional application No. 61/076,916, filed on Jun. 30, 2008.

(51) Int. Cl.
*B60W 10/30* (2006.01)
(52) U.S. Cl. .................... 180/65.265; 903/946
(58) Field of Classification Search ............... 180/65.22, 180/65.25, 65.265, 65.285, 65.27; 903/946
See application file for complete search history.

(56) References Cited

U.S. PATENT DOCUMENTS

| | | | | |
|---|---|---|---|---|
| 5,669,842 A * | 9/1997 | Schmidt | | 475/5 |
| 6,053,842 A * | 4/2000 | Kitada et al. | | 477/5 |
| 6,090,005 A * | 7/2000 | Schmidt et al. | | 475/5 |
| 6,155,954 A * | 12/2000 | Itoyama et al. | | 477/5 |
| 6,253,137 B1 * | 6/2001 | Abo et al. | | 701/51 |
| 6,656,069 B2 * | 12/2003 | Sugano | | 474/28 |
| 6,656,083 B2 * | 12/2003 | Esaki | | 477/5 |
| 6,752,225 B2 * | 6/2004 | Kojima | | 180/65.25 |
| 6,805,647 B2 * | 10/2004 | Silveri et al. | | 475/4 |
| 6,835,160 B2 * | 12/2004 | Kitano et al. | | 477/5 |
| 7,524,263 B2 * | 4/2009 | Johnson et al. | | 477/3 |
| 7,555,374 B2 * | 6/2009 | Wu et al. | | 701/29 |
| 7,559,864 B2 * | 7/2009 | Maeda et al. | | 475/5 |
| 7,618,343 B2 * | 11/2009 | Tabata et al. | | 477/3 |
| 7,650,956 B2 * | 1/2010 | Hirata et al. | | 180/248 |
| 7,670,253 B2 * | 3/2010 | Sah | | 477/3 |
| 7,730,982 B2 * | 6/2010 | Hidaka et al. | | 180/65.265 |
| 7,771,309 B2 * | 8/2010 | Kamada et al. | | 477/3 |
| 7,803,086 B2 * | 9/2010 | Tabata et al. | | 477/3 |
| 7,806,801 B2 * | 10/2010 | Gohring et al. | | 477/5 |
| 7,846,051 B2 * | 12/2010 | Holmes et al. | | 475/5 |
| 7,848,858 B2 * | 12/2010 | Tabata et al. | | 701/22 |
| 7,869,924 B2 * | 1/2011 | Wu et al. | | 701/51 |
| 7,905,807 B2 * | 3/2011 | Shimizu et al. | | 475/5 |
| 7,922,618 B2 * | 4/2011 | Matsubara et al. | | 477/3 |
| 7,927,244 B2 * | 4/2011 | Iwanaka et al. | | 475/5 |
| 7,953,533 B2 * | 5/2011 | Tsuda | | 701/51 |
| 7,959,535 B2 * | 6/2011 | Matsubara et al. | | 477/3 |

(Continued)

FOREIGN PATENT DOCUMENTS

CN    1182828 A    5/1998

(Continued)

*Primary Examiner* — Jeffrey J Restifo
(74) *Attorney, Agent, or Firm* — Quinn Law Group, PLLC

(57) ABSTRACT

A vehicle includes a vehicle engine and a transmission. A first electric motor is driveably connected to the transmission. A second electric motor is driveably connected to the vehicle engine. At least one selectively engagable clutch is located between the engine and the transmission to provide slip. The at least one clutch is engaged after the engine reaches a predetermined speed differential with the transmission.

5 Claims, 4 Drawing Sheets

U.S. PATENT DOCUMENTS

| | | | |
|---|---|---|---|
| 7,980,991 B2* | 7/2011 | Kumazaki et al. | 477/15 |
| 7,987,934 B2* | 8/2011 | Huseman | 180/65.21 |
| 7,992,661 B2* | 8/2011 | Nomura et al. | 180/65.21 |
| 7,998,021 B2* | 8/2011 | Matsubara et al. | 477/3 |
| 7,998,023 B2* | 8/2011 | Holmes et al. | 477/5 |
| 8,002,665 B2* | 8/2011 | Heap et al. | 477/3 |
| 2006/0254872 A1 | 11/2006 | Maguire | |
| 2006/0266567 A1 | 11/2006 | Tamai et al. | |
| 2007/0087894 A1 | 4/2007 | Tsuneyoshi et al. | |
| 2007/0284176 A1 | 12/2007 | Sah et al. | |
| 2010/0087290 A1* | 4/2010 | Schoenek et al. | 477/5 |
| 2011/0178686 A1* | 7/2011 | Morris | 701/51 |
| 2011/0212804 A1* | 9/2011 | Imamura et al. | 475/150 |

FOREIGN PATENT DOCUMENTS

| | | |
|---|---|---|
| CN | 1405030 A | 3/2003 |
| JP | 10148142 A | 6/1998 |

\* cited by examiner

APPARATUS AND METHOD FOR A QUICK START ENGINE AND HYBRID SYSTEM

CROSS REFERENCE TO RELATED APPLICATIONS

This application claims the benefit of U.S. Provisional Application Ser. No. 61/076,916 filed Jun. 30, 2008, the entire contents of which are hereby incorporated by reference.

TECHNICAL FIELD

The present invention relates to a vehicle having a hybrid system, and more particularly to an arrangement for propelling a vehicle having a hybrid system.

BACKGROUND OF THE INVENTION

Electric hybrid vehicles offer the potential for significant fuel economy improvements over their conventional counterparts. The hybrid systems use electric motors to drive the vehicle when accelerating from a stop. After a certain vehicle speed is reached, the electric motors do not have the capacity to provide the power required by the vehicle. When the capacity of the electric motors is reached, the vehicle engine is started using friction launch clutches and one of the electric motors which drive the transmission. The friction launch clutches gradually reduce the slip between the engine and the hybrid system until the clutch is fully engaged and the engine and the transmission are operating at the same speed as one another. However, the friction launch clutches require high shift energy and result in efficiency losses.

SUMMARY OF THE INVENTION

An arrangement for a vehicle with a hybrid transmission that can reduce energy losses during vehicle launch is desired. A vehicle includes a vehicle engine and a transmission. A first electric motor is driveably connected to the transmission. A second electric motor is driveably connected to the vehicle engine. At least one selectively engagable clutch is located between the engine and the transmission and is operable to provide slip. The clutch is engaged after the engine reaches a predetermined speed differential with the transmission. When the selectively engagement clutch is disengaged the transmission is drivingly disconnected from the engine A method of propelling the vehicle includes driving the transmission with the first motor/generator then starting the vehicle engine with the second motor/generator when the vehicle has reached a predetermined vehicle speed. The clutch is engaged when a predetermined differential speed between the transmission and the engine is reached.

The above features and advantages, and other features and advantages of the present invention will be readily apparent from the following detailed description of the preferred embodiments and best modes for carrying out the present invention when taken in connection with the accompanying drawings.

DESCRIPTION OF THE PREFERRED EMBODIMENTS

Figure 1:
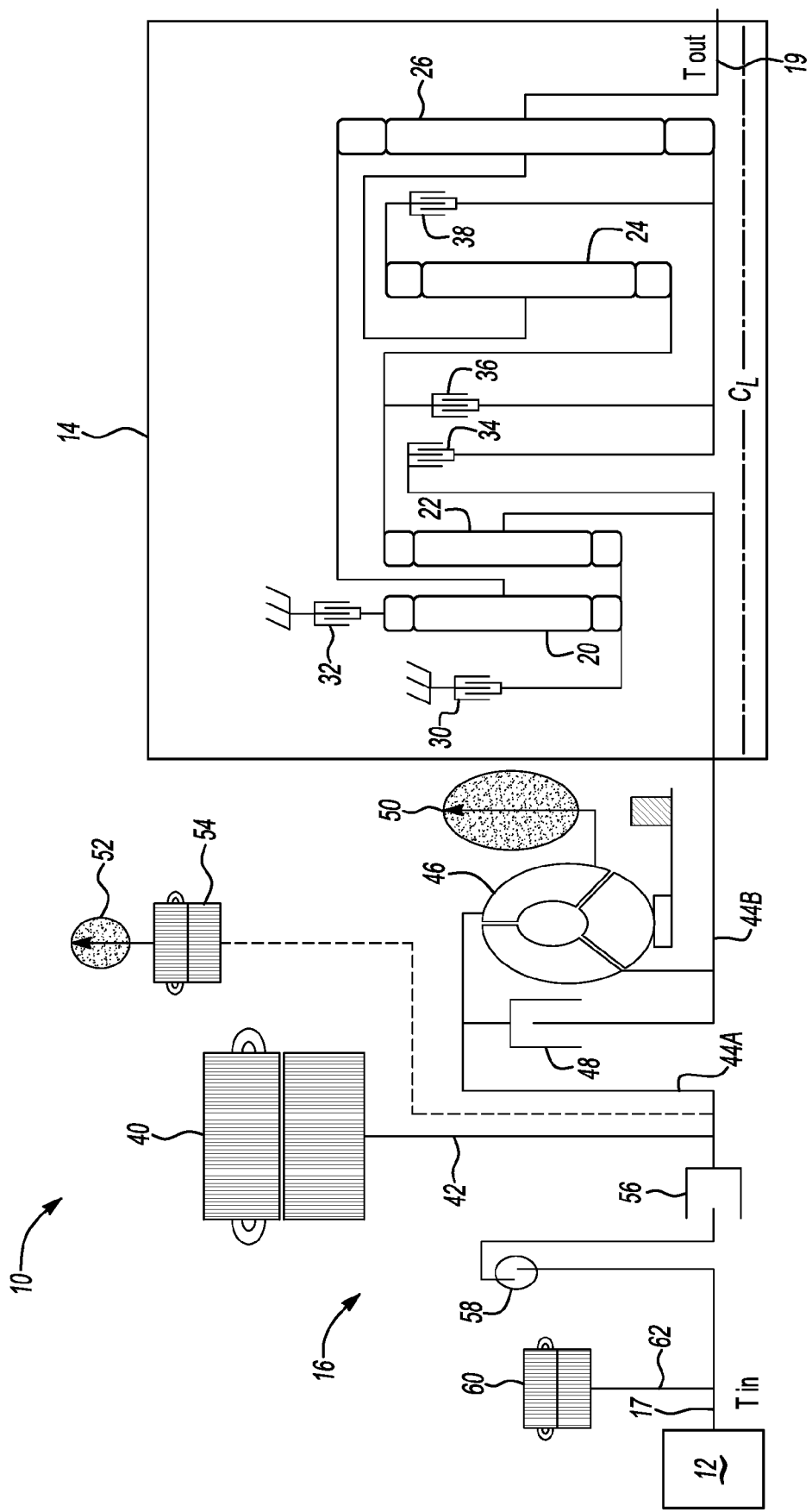
FIG. 1 is a schematic representation of a first embodiment of a powertrain including a portion of a transmission and a hybrid system.

With reference to FIG. 1, a powertrain 10 is at least partially shown, including an engine 12 connected to a transmission 14 through a hybrid system 16. The transmission 14 is designed to receive its driving power from the engine 12 and the hybrid system 16. As shown, the engine 12 has an output shaft that serves as the input member 17 of the hybrid system 16.

The transmission 14 includes a plurality of planetary gear sets 20, 22, 24 and 26. The planetary gear sets 20, 22, 24 and 26 are connected to stationary members and one another by a plurality of transmission clutches 30, 32, 34, 36 and 38. An output member 19 is connected to one of the planetary gears sets 20, 22, 24 and 26 to transfer torque from the transmission 14 to a drivetrain (not shown). In the embodiment shown the output member 19 is connected to planetary gear set 26.

The hybrid system 16 includes a first electric motor/generator 40. The first electric motor/generator 40 is connected to the transmission 14 via connecting members 42, 44A and 44B. A torque converter 46 is connected to the first motor/generator 40 by the connecting members 42 and 44A. The hybrid system output connecting member 44B connects the output of the torque converter 46 to the transmission 14. The torque converter 46 allows torque multiplication and ensures vibration reduction during vehicle launch when the first electric motor/generator 40 is used. During certain driving conditions the torque converter 46 can be locked, or bypassed, by closing a torque converter clutch 48. Torque is transferred from the first motor/generator 40 to the transmission through connecting members 42, 44A and 44B and the torque converter clutch 48. Closing the torque converter clutch 48 increases fuel economy of the vehicle in which the powertrain 10 is located.

At vehicle launch the first electric motor/generator 40 and main pump 50 alone may not be sufficient to provide adequate oil pressure and flow to the hybrid system 16 due to low speed of the first electric motor/generator 40 or the main pump 50. In this instance, an auxiliary pump 52 and auxiliary motor 54 to drive the auxiliary pump 52 may be used to provide the additional pressure and flow required by the hybrid system 16. The auxiliary pump 52 and auxiliary motor 54 are shown connected to the hybrid system 16 with a dotted line to indicate the non-mechanical connection (i.e. electrical power connection and fluid connection) between the hybrid system 16 and the auxiliary pump 52 and the auxiliary motor 54.

When the power demand on the powertrain 10 is greater than the first electric motor/generator 40 can provide, the vehicle engine 12 may then be started. The vehicle engine 12 may also be started when the power demand of the powertrain 10 is approaching a point wherein the first electric motor/generator 40 cannot provide sufficient power to the vehicle engine 12. One skilled in the art would know the appropriate conditions at which to start the engine 12.

A second electric motor/generator 60 is used to start the engine 12. The second electric motor/generator 60 is also known as a belt alternator starter or motor starter alternator. The second electric motor/generator 60 directly drives the engine 12 through a connecting member 62. The direct drive provides for quick engine start. An engine disconnect clutch 56 is located between the engine 12 and the transmission 14. The engine disconnect clutch 56 is disengaged when the engine 12 is started. As a result, the second motor/generator 60 is not drivably connected to the transmission 14 at the time the engine 12 is started. When the engine 12 has reached a predetermined speed, or a predetermined speed differential between the engine 12 and the hybrid system 16 (specifically members 42 and 44A) is reached, the engine disconnect clutch 56 is engaged. That is, when the speed differential across the engine disconnect clutch 56 reaches a predetermined maximum difference the engine disconnect clutch 56 will be engaged. The engine disconnect clutch 56 is a low energy clutch. A low energy clutch is a clutch in which the required output of the clutch is below an average energy level. Due to this, the heat dissipation required by the engine disconnect clutch 56 is reduced and the required capacity of the engine disconnect clutch 56 is lowered. To maintain smooth operation of the powertrain 10 during this time the engine disconnect clutch 56 is used to provide any necessary slip between the engine 12 and the transmission 14. However, because the engine 12 is already at or near the transmission 14 speed when the engine disconnect clutch 56 begins to engage the slip is minimal. A damper 58 may also be included in the hybrid system 16 between the engine 12 and the engine disconnect clutch 56. The damper 58 reduces vibration from the engine 12 to the remainder of the powertrain 10.

Figure 2:
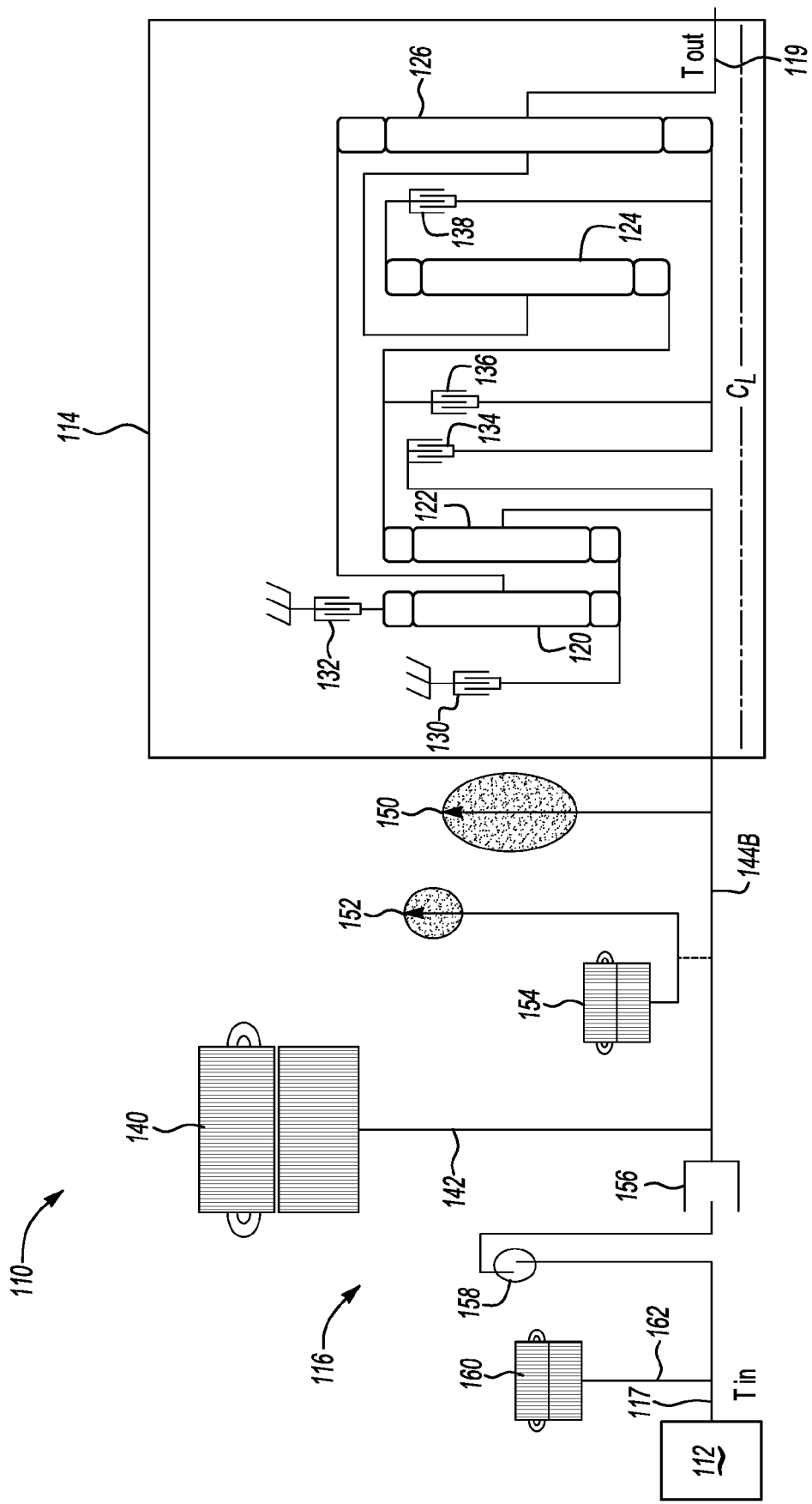
FIG. 2 is a schematic representation of a second embodiment of a powertrain including a portion of a transmission and a hybrid system.

FIG. 2 is an alternate embodiment illustrating a powertrain 110. A transmission 114 is designed to receive its driving power from an engine 112 and a hybrid system 116. As shown, the engine 112 has an output shaft that serves as the input member 117 of the hybrid system 116.

The transmission 114 includes a plurality of planetary gear sets 120, 122, 124 and 126. The planetary gear sets 120, 122, 124 and 126 are connected to stationary members and one another by a plurality of transmission clutches 130, 132, 134, 136 and 138. An output member 119 is connected to one of the planetary gears sets 120, 122, 124 and 126 to transfer torque from the transmission 114 to the drivetrain. In the embodiment shown the output member 119 is connected to planetary gear set 126.

The hybrid system 116, includes a first electric motor/generator 140 which is directly connected to the transmission 114 through a connecting member 142. A second electric motor 160 starts the engine 112 in a similar manner as described above. That is, the second electric motor/generator 160 directly drives the engine 112 through a connecting member 162. The direct drive provides for quick engine start. An engine disconnect clutch 156 is located between the engine 112 and the transmission 114. The engine disconnect clutch 156 is disengaged when the engine 112 is started. As a result, the second motor/generator 160 is not drivably connected to the transmission 114 at the time the engine 112 is started. When the engine 112 has reached a predetermined speed, or a predetermined speed differential between the engine 112 and the hybrid system 116 (specifically members 142, 144A) is reached, the engine disconnect clutch 156 is engaged. A hybrid system output connecting member 144B connects the output of the engine disconnect clutch 156 to the transmission 114.

At vehicle launch the first electric motor/generator 140 and a main pump 150 alone may not be sufficient to provide adequate oil pressure and flow to the hybrid system 116 due to the low speed of the first electric motor/generator 140 or the main pump 150. In this instance, an auxiliary pump 152 and auxiliary motor 154 to drive the pump may be used to provide the additional pressure and flow required by the hybrid system 116. The auxiliary pump 152 and auxiliary motor 154 are shown connected to the hybrid system 116 with a dotted line to indicate the non-mechanical connection (i.e. electrical power connection and fluid connection) between the hybrid system 16 and the auxiliary pump 152 and the auxiliary motor 154.

The auxiliary pump 152 and the auxiliary motor 154 also provide the oil pressure necessary for the engine disconnect clutch 156. The engine disconnect clutch 156 is a low energy clutch. A damper 158 may also be connected to the hybrid system 116 between the engine 112 and the engine disconnect clutch 156. The damper 158 reduces vibration from the engine 112 to the remainder of the powertrain 110.

A transmission clutch, 130 for example in FIG. 2, acts as a friction launch clutch to provide slip between the vehicle engine 112 and the transmission 114, eliminating the need for a torque converter. If the heat generated is sufficiently high a second transmission clutch, 132 for example, may also be used as a friction launch clutch.

Figure 3:
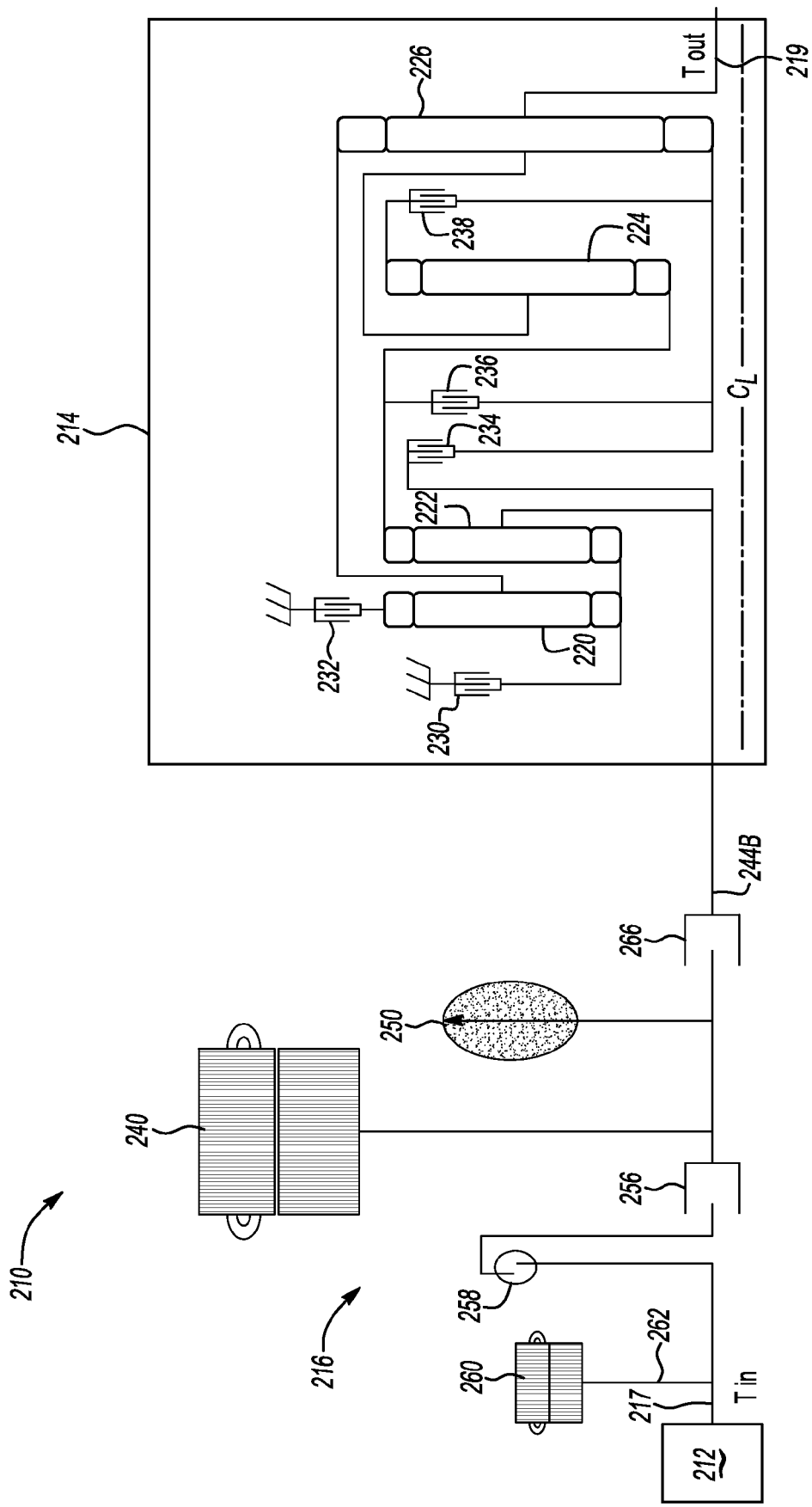
FIG. 3 is a schematic representation of a third embodiment of a powertrain including a portion of a transmission and a hybrid system.

FIG. 3 is another embodiment illustrating a powertrain 210. A transmission 214 is designed to receive its driving power from an engine 212 and a hybrid system 216. As shown, the engine 212 has an output shaft that serves as the input member 217 of the hybrid system 216.

The transmission 214 includes a plurality of planetary gear sets 220, 222, 224 and 226. The planetary gear sets 220, 222, 224 and 226 are connected to stationary members and one another by a plurality of transmission clutches 230, 232, 234, 236 and 238. An output member 219 is connected to one of the planetary gears sets 220, 222, 224 and 226 to transfer torque from the transmission 214 to the drivetrain. In the embodiment shown the output member 219 is connected to planetary gear set 226.

The hybrid system 216, includes a first electric motor/generator 240 which is connected to the transmission 214 through a friction launch clutch 266. A hybrid system output connecting member 244B connects the output of the friction launch clutch 266 to the transmission 214.

The second electric motor 260 starts the engine 212 in a similar manner as described above. That is, the second electric motor/generator 260 directly drives the engine 212 through a connecting member 262. The direct drive provides for quick engine start. An engine disconnect clutch 256 is located between the engine 212 and the transmission 214. The engine disconnect clutch 256 is disengaged when the engine 212 is started. As a result, the second motor/generator 260 is not drivably connected to the transmission 214 at the time the engine 212 is started. When the engine 212 has reached a predetermined speed, or a predetermined speed differential between the engine 212 and the hybrid system 216 is reached, the engine disconnect clutch 256 is engaged. A main pump 250 and the first electric motor/generator 240 provide the oil pressure necessary for operation of the engine disconnect clutch 256. The friction launch clutch 266 packaged between the main pump 250 and the transmission 214 allows the first electric motor/generator 240 to drive the pump 266 with high speed (rpm). The friction launch clutch 266 is opened and disconnecting the first electric motor/generator 240 from the transmission 214 and the rest of the driveline (not numbered). After reaching adequate speed (and required oil flow and pressure) of the main pump 250 the friction launch clutch 266 is applied with a high slip speed to connect the first electric motor/generator 240 and the transmission 214. Thus, the clutch 266 is acting as a friction launch clutch. A damper 258 may also be connected to the hybrid system 216 between the engine 212 and the engine disconnect clutch 256. The damper 258 reduces vibration from the engine 212 to the remainder of the powertrain 210.

Figure 4:
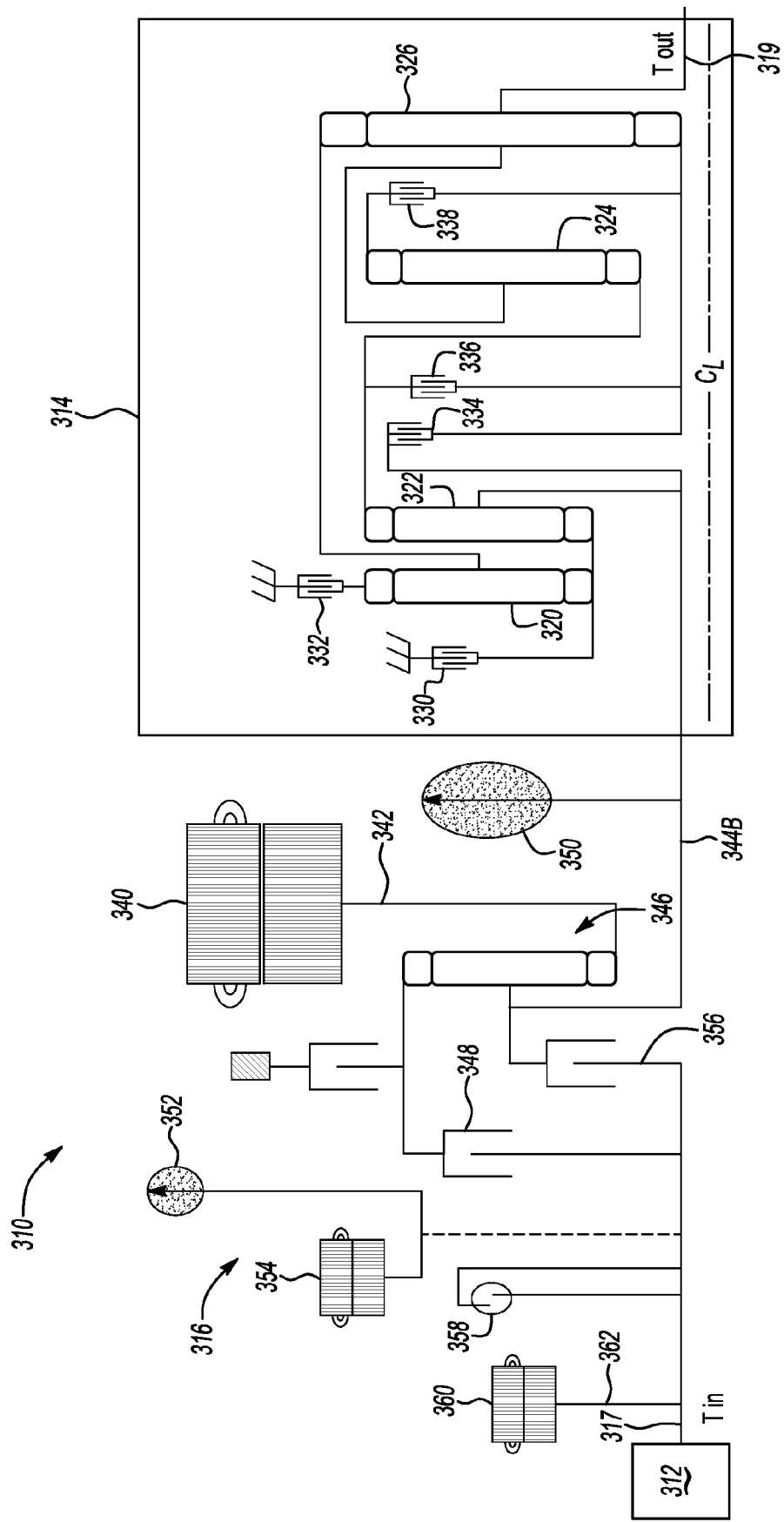
FIG. 4 is a schematic representation of a fourth embodiment of a powertrain including a portion of a transmission and a hybrid system.

FIG. 4 is another embodiment illustrating a powertrain 310. In the fourth embodiment a transmission 314 is designed to receive its driving power from an engine 312 and a hybrid system 316. As shown, the engine 312 has an output shaft that serves as the input member 317 of the hybrid system 316.

The transmission 314 includes a plurality of planetary gear sets 320, 322, 324 and 326. The planetary gear sets 320, 322, 324 and 326 are connected to stationary members and one another by a plurality of transmission clutches 330, 332, 334, 336 and 338. An output member 319 is connected to one of the planetary gears sets 320, 322, 324 and 326 to transfer torque from the transmission 314 to the drivetrain. In the embodiment shown the output member 319 is connected to planetary gear set 326.

The hybrid system 316, includes a first electric motor/generator 340 which is connected to the transmission 314 through a torque converter 346. The torque converter 346 is an electric torque converter. The torque converter 346 is connected to the first electric motor/generator 340 by the connecting member 342. A hybrid system output connecting member 344B connects the output of the torque converter 346 to the transmission 314.

A second electric motor 360 starts the engine 312 in a similar manner as described above. That is, the second electric motor/generator 360 directly drives the engine 312 through a connecting member 362. The direct drive provides for quick engine start. An engine disconnect clutch 356 is located between the engine 312 and the transmission 314. The engine disconnect clutch 356 is disengaged when the engine 312 is started. As a result, the second motor/generator 360 is not drivably connected to the transmission 314 at the time the engine 312 is started. When the engine 312 has reached a predetermined speed, or a predetermined speed differential between the engine 312 and the hybrid system 316 is reached, the engine disconnect clutch 356 is engaged. The torque converter 346 allows torque multiplication and ensures vibration reduction during vehicle launch with the first electric motor/generator 340. During certain driving conditions the torque converter 346 can be locked, or bypassed, by closing a torque converter clutch 348. This increases fuel economy of the vehicle in which the powertrain 310 is located.

At vehicle launch the first electric motor/generator 340 and a main pump 350 alone may not be sufficient to provide adequate oil pressure and flow to the hybrid system 316. In this instance, an auxiliary pump 352 and auxiliary motor 354 to drive the pump may be used to provide the additional pressure and flow required by the hybrid system 316. The auxiliary pump 352 and auxiliary motor 354 are shown connected to the hybrid system 316 with a dotted line to indicate the non-mechanical connection (i.e. electrical power connection and fluid connection) between the hybrid system 316 and the auxiliary pump 352 and the auxiliary motor 354.

The auxiliary pump 352 and the auxiliary motor 354 also provide the oil pressure necessary for the engine disconnect clutch 356. The engine disconnect clutch 356 is a low energy clutch. A damper 358 may also be connected to the hybrid system 316 between the engine 312 and the engine disconnect clutch 356. The damper 358 reduces vibration from the engine 312 to the remainder of the powertrain 310.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
a vehicle engine;
a transmission;
a first electric motor driveably connected to the transmission;
a second electric motor driveably connected to the vehicle engine;
at least one selectively engagable clutch operable to provide slip between the engine and the transmission, wherein the engine reaches a predetermined speed differential with the transmission prior to engagement of the at least one clutch;
a main pump driven by the first electric motor when the at least one selectively engagable clutch is not engaged to provide oil pressure to at least the transmission and the at least one clutch; and
wherein the transmission is drivingly disconnected from the engine when the at least one selectively engageable clutch is disengaged.

2. The vehicle of claim 1, further comprising a damper connected between the vehicle engine and the at least one clutch.

3. The vehicle of claim 1, further comprising an auxiliary motor and an auxiliary pump, wherein the auxiliary motor is connected to drive the auxiliary pump to provide oil pressure to at least the transmission and the at least one clutch in addition to the main pump.

4. The vehicle of claim 1, wherein the main pump is operable to engage and disengage the at least one clutch.

5. The vehicle of claim 1, wherein at least one transmission clutch is packaged within the transmission with the electric motors axially between the engine and the transmission; and wherein the at least one transmission clutch is a friction launch clutch.

* * * * *